(12) United States Patent
Imasato

(10) Patent No.: US 11,499,629 B2
(45) Date of Patent: Nov. 15, 2022

(54) CONTROL DEVICE FOR CONTINUOUSLY VARIABLE TRANSMISSION

(71) Applicant: Honda Motor Co., Ltd., Tokyo (JP)

(72) Inventor: Takuro Imasato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 187 days.

(21) Appl. No.: 17/099,787

(22) Filed: Nov. 17, 2020

(65) Prior Publication Data

US 2021/0148459 A1    May 20, 2021

(30) Foreign Application Priority Data

Nov. 18, 2019  (JP) .............................. JP2019-208328

(51) Int. Cl.
*F16H 59/70* (2006.01)
*F16H 61/02* (2006.01)
(Continued)

(52) U.S. Cl.
CPC ......... *F16H 61/0276* (2013.01); *F16H 59/44* (2013.01); *F16H 59/70* (2013.01);
(Continued)

(58) Field of Classification Search
CPC .... F16H 59/44; F16H 59/70; F16H 2059/704; F16H 61/0009; F16H 61/0021; F16H 61/0276
See application file for complete search history.

(56) References Cited

U.S. PATENT DOCUMENTS 5,085,107 A * 2/1992 Tatara ............... F16H 61/66259
477/45
5,157,992 A * 10/1992 Hayashi ............ F16H 61/66272
477/45

(Continued)

FOREIGN PATENT DOCUMENTS

JP    H11182666    7/1999
JP    2001304389   10/2001

(Continued)

OTHER PUBLICATIONS

Office Action of Japan Counterpart Application, with English translation thereof, dated Aug. 30, 2022, pp. 1-5.

*Primary Examiner* — Edwin A Young
(74) *Attorney, Agent, or Firm* — JCIPRNET

(57) ABSTRACT

Provided is a control device for a continuously variable transmission, which is capable of effectively preventing occurrence of surge pressure due to a stroke of a driven pulley being stopped by abutment. The control device for the continuously variable transmission includes a pressure regulating valve regulating an oil pressure of oil supplied from an oil supply source to a cylinder chamber of the driven pulley, a control valve controlling the pressure regulating valve, and a control part controlling the control valve. If the control part determines that a gear ratio of the continuously variable transmission is maximum, as a first condition, when an instructed oil pressure of the control valve for the pressure regulating valve is larger than an oil pressure of oil supplied from the pressure regulating valve to the driven pulley, a control for lowering the instructed oil pressure is performed.

14 Claims, 8 Drawing Sheets

(51) Int. Cl.
  *F16H 61/00* (2006.01)
  *F16H 59/44* (2006.01)
(52) U.S. Cl.
  CPC ..... *F16H 61/0009* (2013.01); *F16H 61/0021* (2013.01); *F16H 2059/704* (2013.01)

(56) References Cited

U.S. PATENT DOCUMENTS

| | | | | |
|---|---|---|---|---|
| 6,086,513 | A * | 7/2000 | Tominaga | F16H 61/0021 477/169 |
| 6,530,218 | B2 * | 3/2003 | Saito | F16H 61/4043 60/489 |
| 2007/0082769 | A1 * | 4/2007 | Nihei | F16H 61/66272 474/8 |
| 2010/0255942 | A1 * | 10/2010 | Ogata | F16H 61/12 474/18 |

FOREIGN PATENT DOCUMENTS

| | | |
|---|---|---|
| JP | 2002340155 | 11/2002 |
| JP | 2013181408 | 9/2013 |

* cited by examiner

|  | Shift speed | DN instructed pressure | O/P discharge amount | Surge pressure occurs? |
|---|---|---|---|---|
| [1] | Large | Large | Large | Yes |
| [2] | Large | Large | Small | Yes (large surge) |
| [3] | Large | Small | Large | No |
| [4] | Large | Small | Small | No |
| [5] | Small | Large | Large | No |
| [6] | Small | Large | Small | Yes |
| [7] | Small | Small | Large | No |
| [8] | Small | Small | Small | No |

FIG. 5

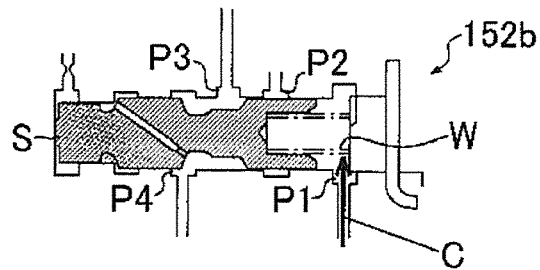
FIG. 6A
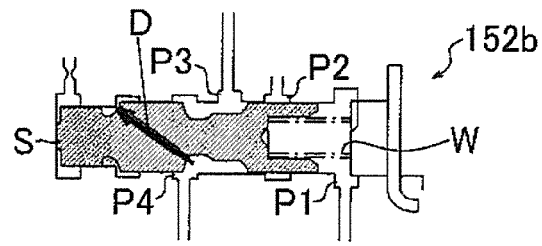
FIG. 6B
| Shift speed | DN instructed pressure | O/P discharge amount | Surge pressure occurs? |
|---|---|---|---|
| Large | Large | Large | Yes |
| Large | Large | Small | Yes (large surge) |
| Small | Large | Small | Yes |
FIG. 7

CONTROL DEVICE FOR CONTINUOUSLY VARIABLE TRANSMISSION

CROSS-REFERENCE TO RELATED APPLICATION

This application claims the priority benefits of Japanese application no. 2019-208328, filed on Nov. 18, 2019. The entirety of the above-mentioned patent application is hereby incorporated by reference herein and made a part of this specification.

BACKGROUND

Technical Field

The disclosure relates to a control device for a continuously variable transmission.

Description of Related Art

Conventionally, there is known a belt-type continuously variable transmission (CVT) which is composed of movable drive pulley (DR pulley) and driven pulley (DN pulley) and an endless metal belt wound around these two pulleys, as shown in Patent Document 1, for example. This type of continuously variable transmission has a structure that changes the axial thrust applied to the drive pulley and the driven pulley and thereby changes the pulley width of the drive pulley and the driven pulley to change the gear ratio steplessly.

In the belt-type continuously variable transmission as described above, the driven pulley is composed of a fixed side driven pulley half body and a movable side driven pulley half body which is relatively movable with respect to the fixed side driven pulley half body. Then, a cylinder chamber of the driven pulley is formed on a lateral side of the movable side driven pulley half body, and the oil pressure supplied from an oil pressure control device to the cylinder chamber generates the axial thrust (driven pulley axial thrust) for moving the movable side driven pulley half body in the axial direction. The drive pulley also has a similar configuration including a fixed side drive pulley half body and a movable side drive pulley half body.

In the belt-type continuously variable transmission as described above, when shifting to the side where the gear ratio becomes larger (the low ratio side), both the movable side driven pulley half body and the movable side drive pulley half body move to the end where the gear ratio of each of them becomes maximum (the end on the low ratio side). However, at that time, in the case of a structure in which the moveable side driven pulley half body is abutted against the end before the moveable side drive pulley half body, the stroke of the movable side drive pulley half body is forcibly stopped at the abutting position when returning the gear ratio of the continuously variable transmission to the maximum (to the low ratio). At that time, since the supply (consumption) of oil to the cylinder chamber of the driven pulley suddenly stops at the abutment, there is a risk that surge pressure (suddenly rising oil pressure) may occur before the pressure regulating valve that is supplying oil to the driven pulley can open the oil passage for the oil. That is, as the stroke of the movable side driven pulley half body stops at the abutment, the flow rate of oil consumed by the driven pulley suddenly becomes 0, so surge pressure may occur while the dischargeable flow rate of the pressure regulating valve exceeds the flow rate of oil returning from the driven pulley.

RELATED ART

Patent Document

[Patent Document 1] Japanese Laid-Open No. 11-182666

SUMMARY

A control device for a continuously variable transmission according to the disclosure includes: a belt-type continuously variable transmission (100) including movable drive pulley (5) and driven pulley (8) mounted on a vehicle, and an endless belt (7) wound around the two pulleys; and an oil pressure control device (110) controlling the continuously variable transmission (100). The oil pressure control device (110) includes: a pressure regulating valve (152b) that regulates an oil pressure of oil supplied from an oil supply source (120, 130) to a cylinder chamber (9) of the driven pulley (8); a control valve (168b) that controls the pressure regulating valve (152b); a control part (180) that controls the control valve (168b); and an oil pressure detection part (162) that detects an actual oil pressure of oil supplied from the pressure regulating valve (152b) to the cylinder chamber (9). If the control part (180) determines that a gear ratio of the continuously variable transmission (100) is maximum, as a first condition, when an instructed oil pressure of the control valve (168b) for the pressure regulating valve (152b) is larger than the oil pressure of oil supplied from the pressure regulating valve (152b) to the driven pulley (8), a control for lowering the instructed oil pressure is performed.

BRIEF DESCRIPTION OF THE DRAWINGS

FIG. 5 is a table summarizing whether surge pressure occurs.

FIG. 6A and FIG. 6B are diagrams for explaining the flow of oil in a valve under each condition.

FIG. 7 is a diagram for explaining conditions for performing surge pressure occurrence prevention control, and is a list of cases where surge pressure occurs.

DESCRIPTION OF THE EMBODIMENTS

Figure 1:
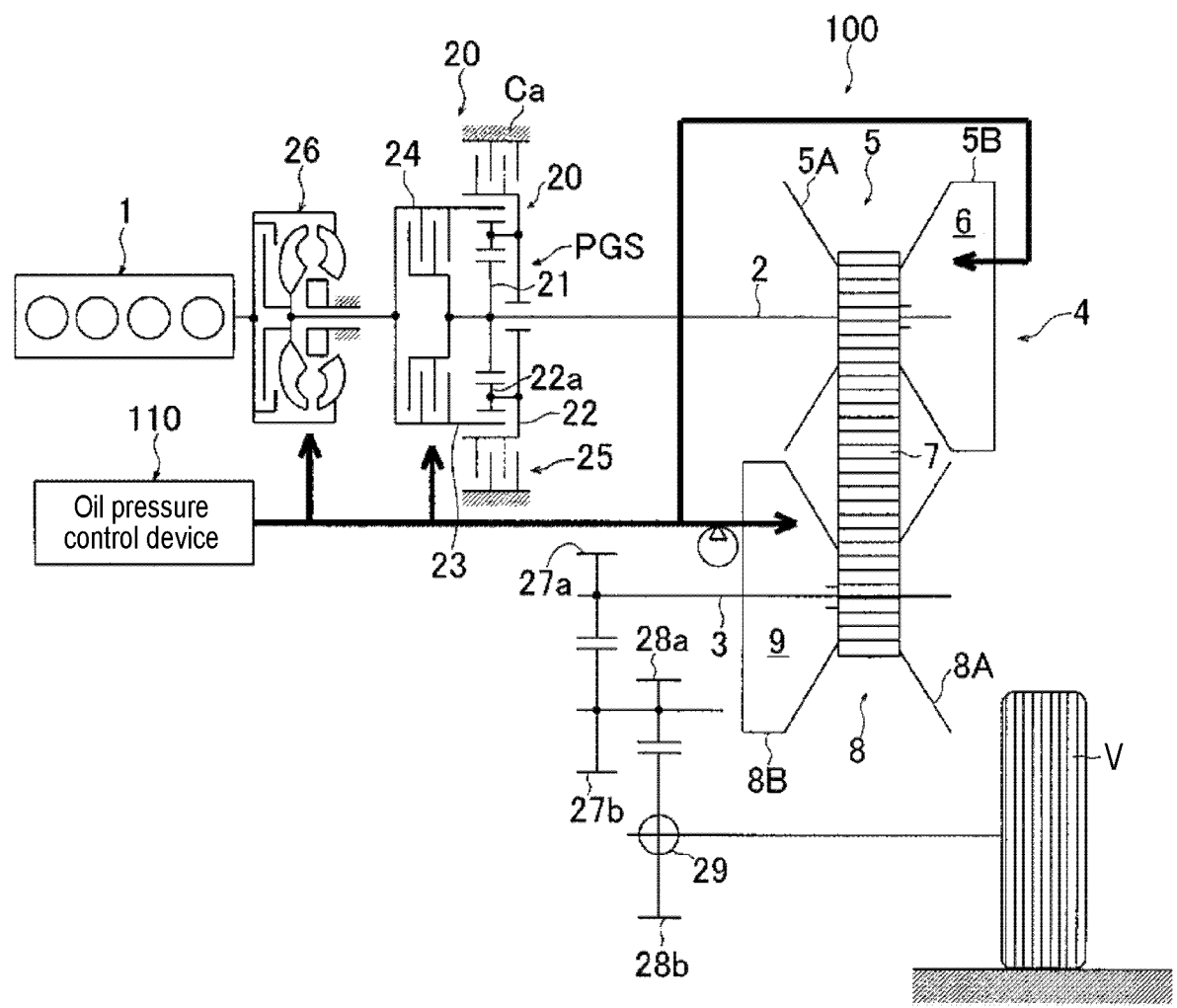
FIG. 1 is a diagram schematically showing the configuration of a belt-type continuously variable transmission and an oil pressure control device thereof according to an embodiment of the disclosure.

In view of the above, the disclosure provides a control device for a continuously variable transmission, which is capable of effectively preventing the occurrence of surge pressure due to the stroke of the movable side driven pulley half body of the driven pulley being stopped by abutment.

Means for Solving the Problems

A control device for a continuously variable transmission according to the disclosure includes: a belt-type continuously variable transmission (100) including movable drive pulley (5) and driven pulley (8) mounted on a vehicle, and an endless belt (7) wound around the two pulleys; and an oil pressure control device (110) controlling the continuously variable transmission (100). The oil pressure control device (110) includes: a pressure regulating valve (152b) that regulates an oil pressure of oil supplied from an oil supply source (120, 130) to a cylinder chamber (9) of the driven pulley (8); a control valve (168b) that controls the pressure regulating valve (152b); a control part (180) that controls the control valve (168b); and an oil pressure detection part (162) that detects an actual oil pressure of oil supplied from the pressure regulating valve (152b) to the cylinder chamber (9). If the control part (180) determines that a gear ratio of the continuously variable transmission (100) is maximum, as a first condition, when an instructed oil pressure of the control valve (168b) for the pressure regulating valve (152b) is larger than the oil pressure of oil supplied from the pressure regulating valve (152b) to the driven pulley (8), a control for lowering the instructed oil pressure is performed. "A case where it is determined that the gear ratio of the continuously variable transmission is maximum" described in the disclosure may also include a case where it is determined that the gear ratio reaches a value that can be regarded as the maximum value, in addition to the case where it is determined that the gear ratio of the continuously variable transmission reaches the substantially the maximum value.

If the instructed oil pressure of the control valve for the pressure regulating valve is larger than the oil pressure (actual oil pressure) of the oil supplied from the pressure regulating valve to the driven pulley, in the pressure regulating valve, the port communicating with the discharge oil passage is blocked, so there is no way for discharging the oil returned from the driven pulley, and surge pressure may occur. Therefore, in the disclosure, as the first condition, when the instructed oil pressure described above is larger than the actual oil pressure, the control for lowering the instructed oil pressure of the control valve for the pressure regulating valve is performed, making it possible to effectively prevent the occurrence of surge pressure.

Further, in addition to the first condition, as a second condition, when a discharge amount of oil discharged from the oil supply source (120, 130) is smaller than a predetermined amount, the control for lowering the instructed oil pressure may be performed.

If the discharge amount of oil from the oil supply source is small (the discharge pressure is small), the flow rate of the oil supplied to the pressure regulating valve becomes small (the oil pressure of the oil becomes small). In this case, the port communicating with the discharge oil passage in the pressure regulating valve is also blocked, so there is no way for discharging the oil returned from the driven pulley, and surge pressure may occur. Therefore, in the disclosure, as the second condition, when the discharge amount of oil from the oil supply source is smaller than the predetermined amount, the control for lowering the instructed oil pressure of the control valve for the pressure regulating valve is performed, making it possible to effectively prevent the occurrence of surge pressure.

Further, in addition to the first condition and the second condition, as a third condition, when a shift speed of the continuously variable transmission (100) is higher than a predetermined speed, the control for lowering the instructed oil pressure may be performed.

When the shift speed of the continuously variable transmission is higher than the predetermined speed, the momentum of the moveable side driven pulley half body abutting against the end becomes stronger as compared with the case where the shift speed is low. In addition, the change amount of the flow rate of the oil supplied to the continuously variable transmission also becomes large. Therefore, there is a concern that the surge pressure generated may become large. Therefore, in the disclosure, as the third condition, when the shift speed of the continuously variable transmission is higher than the predetermined speed, the control for lowering the instructed oil pressure of the control valve for the pressure regulating valve is performed, making it possible to effectively prevent the occurrence of large surge pressure.

Further, the control for lowering the instructed oil pressure may be started when the gear ratio of the continuously variable transmission (100) reaches a predetermined value, and the predetermined value of the gear ratio may be a gear ratio obtained from a relationship between the shift speed and the gear ratio of the continuously variable transmission (100) determined in advance according to the shift speed of the continuously variable transmission (100). In addition, in this case, a gear ratio for starting the control for lowering the instructed oil pressure when the shift speed of the continuously variable transmission (100) is high is smaller than a gear ratio when the shift speed is low.

According to this configuration, the control for lowering the instructed oil pressure of the control valve for the pressure regulating valve can be started at an appropriate timing according to the shift speed of the continuously variable transmission. Therefore, it is possible to more effectively prevent the occurrence of surge pressure.

Further, the pressure regulating valve (152b) may include a first port (P1) to which oil from the control valve (168b) that controls the pressure regulating valve (152b) is supplied, a second port (P2) which communicates with a discharge oil passage that discharges oil, a third port (P3) which supplies oil to the driven pulley (8), and a fourth port (P4) which supplies oil from the oil supply source (120, 130), and when the instructed oil pressure of the control valve (168b) for the pressure regulating valve (152b) is larger than the oil pressure of oil supplied from the pressure regulating valve (152b) to the driven pulley (8), the second port (P2) may be blocked.

According to this configuration, when the instructed oil pressure of the control valve for the pressure regulating valve is larger than the oil pressure of the oil supplied from the pressure regulating valve to the driven pulley, the second port is blocked, so there is a risk that surge pressure may occur. In the disclosure, the control for lowering the instructed oil pressure of the control valve for the pressure regulating valve is performed, making it possible to effectively prevent the occurrence of surge pressure due to the second port being blocked.

Further, if the vehicle stops after the control for lowering the instructed oil pressure is performed, a control for returning the lowered instructed oil pressure to an original instructed oil pressure may be performed.

When the control for lowering the instructed oil pressure is performed, the gear ratio of the continuously variable transmission does not reach the maximum (the value determined as the maximum, that is, the maximum value on the low ratio side), but becomes a value slightly smaller than the value determined as the maximum (the value on the high ratio side). Therefore, if the vehicle stops once and then restarts in this state, sufficient starting performance may not be ensured. Therefore, if the vehicle stops after the control for lowering the instructed oil pressure is performed, it is preferable to return the instructed oil pressure from the lowered state to the original instructed oil pressure so as to set the gear ratio of the continuously variable transmission to the maximum. Thereby, it is possible to secure sufficient starting performance when the vehicle restarts after stop.

The reference numerals in parentheses above indicate the drawing reference numerals of the corresponding components in the embodiments described later for reference.

Effects

According to the control device for the continuously variable transmission according to the disclosure, it is possible to effectively prevent the occurrence of surge pressure due to the stroke of the movable side driven pulley half body of the driven pulley being stopped by abutment.

Hereinafter, embodiments of the disclosure will be described with reference to the accompanying drawings.

<Structure of Continuously Variable Transmission>

FIG. 1 is a schematic diagram showing the configuration of a belt-type continuously variable transmission and an oil pressure control device thereof according to an embodiment of the disclosure. The oil pressure control device of the continuously variable transmission shown in the figure includes a belt-type continuously variable transmission 100 which changes the axial thrust applied to a drive pulley (DR pulley) 5 and a driven pulley (DN pulley) 8 and thereby changes the pulley width of the drive pulley 5 and the driven pulley 8 to change the gear ratio steplessly, and an oil pressure control device 110 which controls the generation of the axial thrust. The continuously variable transmission 100 controlled by the oil pressure control device 110 includes a transmission input shaft 2 connected to an output shaft of an engine 1 serving as the drive source via a fluid-type torque converter 26, a transmission counter shaft 3 arranged in parallel thereto, a metal belt mechanism 4 arranged between the transmission input shaft 2 and the transmission counter shaft 3, and a forward/reverse switching mechanism 20 arranged on the transmission input shaft 2.

The metal belt mechanism 4 includes the drive pulley 5 rotatably arranged on the transmission input shaft 2, the driven pulley 8 arranged on the transmission counter shaft 3 so as to rotate integrally with the transmission counter shaft 3, and an endless metal belt 7 wound around the drive pulley 5 and the driven pulley 8.

The drive pulley 5 has a fixed side drive pulley half body 5A and a moveable side drive pulley half body 5B. Here, the fixed side drive pulley half body 5A is coupled onto the transmission input shaft 2 and arranged so as not to move in the axial direction. The movable side drive pulley half body 5B is configured to be relatively movable with respect to the fixed side drive pulley half body 5A in the axial direction. A cylinder chamber (DR cylinder chamber) 6 of the drive pulley 5 is formed on a lateral side of the movable side drive pulley half body 5B, and the oil pressure supplied from the oil pressure control device 110 to the DR cylinder chamber 6 generates the axial thrust (drive pulley axial thrust) for moving the moveable side drive pulley half body 5B in the axial direction.

The driven pulley 8 includes a fixed side driven pulley half body 8A and a movable side driven pulley half body 8B. Here, the fixed side driven pulley half body 8A is coupled onto the transmission counter shaft 3 and arranged so as not to move in the axial direction. The moveable side driven pulley half body 8B is configured to be relatively movable with respect to the fixed side driven pulley half body 8A in the axial direction. A cylinder chamber (DN cylinder chamber) 9 of the driven pulley 8 is formed on a lateral side of the movable side driven pulley half body 8B, and the oil pressure supplied from the oil pressure control device 110 to the DN cylinder chamber 9 generates the axial thrust (driven pulley axial thrust) for moving the movable side driven pulley half body 8B in the axial direction.

By controlling the oil pressure supplied to the DR cylinder chamber 6 and the DN cylinder chamber 9, the oil pressure control device 110 can set the axial thrust that does not cause slip of the metal belt 7, and can variably set the pulley width of the drive pulley 5 and the driven pulley 8. Thus, the continuously variable transmission 100 can continuously change the winding radius of the metal belt 7 with respect to the two pulleys 5 and 8 to control the gear ratio steplessly (continuously).

The forward/reverse switching mechanism 20 includes a planetary gear mechanism PGS and a forward/reverse switching clutch (forward clutch 24 and reverse clutch 25). The planetary gear mechanism PGS includes a sun gear 21 coupled to the transmission input shaft 2, a ring gear 23 coupled to the torque converter 26, and a carrier 22 that pivotally supports a pinion 22a meshing with the sun gear 21 and the ring gear 23 to rotate and revolve freely.

The reverse clutch 25 is configured so as to fixedly hold the carrier 22 on a casing Ca. The forward clutch 24 is configured to be capable of connecting the sun gear 21 and the ring gear 23. When the forward clutch 24 is engaged, the sun gear 21, the carrier 22, and the ring gear 23 rotate integrally with the transmission input shaft 2, and the drive pulley (DR pulley) 5 is driven in the same direction (forward direction) as the transmission input shaft 2. On the other hand, when the reverse clutch 25 is engaged, the carrier 22 is fixedly held by the casing Ca, and the ring gear 23 is driven in the direction opposite to the sun gear 21 (reverse direction).

The power of the engine 1 is shifted via the metal belt mechanism 4 and the forward/reverse switching mechanism 20 and transmitted to the transmission counter shaft 3. The power transmitted to the transmission counter shaft 3 is transmitted to a differential mechanism 29 via the gears 27a, 27b, 28a, and 28b and is transmitted from here to the left and right wheels (drive wheels) V (only one is shown).

Figure 2:
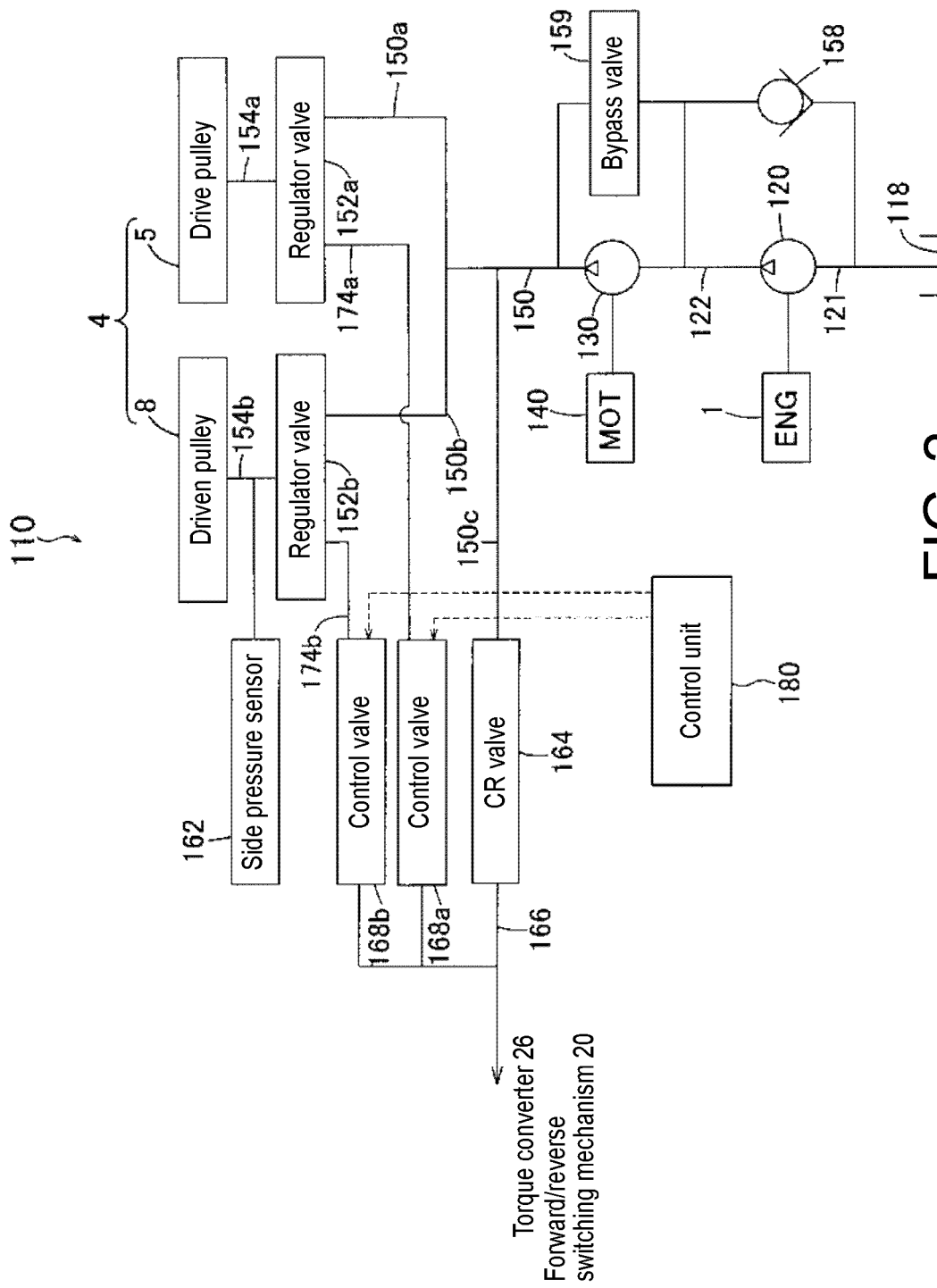
FIG. 2 is a block diagram showing the configuration of an oil pressure circuit of the oil pressure control device.

FIG. 2 is a block diagram showing the configuration of the oil pressure circuit of the oil pressure control device 110. The oil pressure control device 110 has a first pump (mechanical pump) 120 that is driven by the engine 1 and draws up and pumps the oil (hydraulic oil) stored in a reservoir 118 via an oil passage 121. An oil passage 122 that flows the oil pumped from the first pump 120 as the first oil is connected to the output side of the first pump 120.

A second pump 130 having a smaller capacity than the first pump 120 is connected to the downstream side of the oil passage 122. The second pump 130 is an electric pump that is driven by the rotation of a motor 140 and outputs the first oil supplied via the oil passage 122 as the second oil. In this case, the second pump 130 can pressurize the supplied first oil and pump the pressurized first oil as the second oil.

An oil passage 150 is connected to the output side of the second pump 130. The oil passage 150 branches into two oil passages 150a and 150b on the downstream side. One oil passage 150a is connected to the drive pulley 5 (DR cylinder chamber 6) of the continuously variable transmission 100 via a regulator valve 152a and an oil passage 154a. The other oil passage 150b is connected to the driven pulley 8 (DN cylinder chamber 9) of the continuously variable transmission 100 via a regulator valve 152b and an oil passage 154b.

A bypass valve 159 is connected in parallel to the second pump 130 between the two oil passages 122 and 150. The bypass valve 159 is a valve provided to bypass the second pump 130, and can be controlled to open when the second pump 130 is stopped, to bypass the second pump 130 and circulate oil (first oil) from the oil passage 122 on the upstream side to the oil passage 150 on the downstream side.

In addition, a check valve 158 is connected in parallel to the first pump 120 between the two oil passages 121 and 122. The check valve 158 is a check valve provided to bypass the first pump 120, and allows oil (first oil) to circulate in the direction from the oil passage 121 on the upstream side to the oil passage 122 on the downstream side while blocking circulation of oil (second oil) in the direction from the oil passage 122 on the downstream side to the oil passage 121 on the upstream side.

The oil passage 154b is provided with a side pressure sensor (oil pressure sensor) 162 that detects the pressure PDN of the oil supplied to the driven pulley 8 (pulley pressure which is the side pressure of the driven pulley 8).

A CR valve 164 is connected to the downstream side of the oil passage 150c that branches from the oil passage 150. The upstream side of the CR valve 164 is connected to the oil passage 150c, and the downstream side is connected to two control valves 168a and 168b via an oil passage 166. Further, the downstream side of the CR valve 164 (oil passage 166) is connected to the torque converter 26 and the forward/reverse switching mechanism 20 (see FIG. 1) via another valve (not shown).

Each of the control valves 168a and 168b is a normally open type solenoid valve (linear solenoid valve) having a solenoid, and enters a valve closed state while the control signal (current signal) is supplied from a control unit 180 and the solenoid is energized, and enters a valve open state when the solenoid is not energized.

One control valve 168a is a solenoid valve for the drive pulley 5, and in the valve open state, supplies the oil supplied from the CR valve 164 via the oil passage 166 to the regulator valve 152a via an oil passage 174a.

In addition, the other control valve 168b is a solenoid valve for the driven pulley 8, and in the valve open state, supplies the oil supplied from the CR valve 164 via the oil passage 166 to the regulator valve 152b via an oil passage 174b.

Therefore, one regulator valve 152a uses the pressure of the oil supplied from the control valve 168a via the oil passage 174a as the pilot pressure, and if the line pressure PH of the oil supplied via the oil passages 150 and 150a is equal to or larger than a predetermined pressure, the regulator valve 152a enters the valve open state and supplies the oil to the drive pulley 5 via the oil passage 154a. Further, the other regulator valve 152b uses the pressure of the oil supplied from the control valve 168b via the oil passage 174b as the pilot pressure, and if the line pressure PH of the oil supplied via the oil passages 150 and 150b is equal to or larger than a predetermined pressure, the regulator valve 152b enters the valve open state and supplies the oil to the driven pulley 8 via the oil passage 154b.

Figure 3:
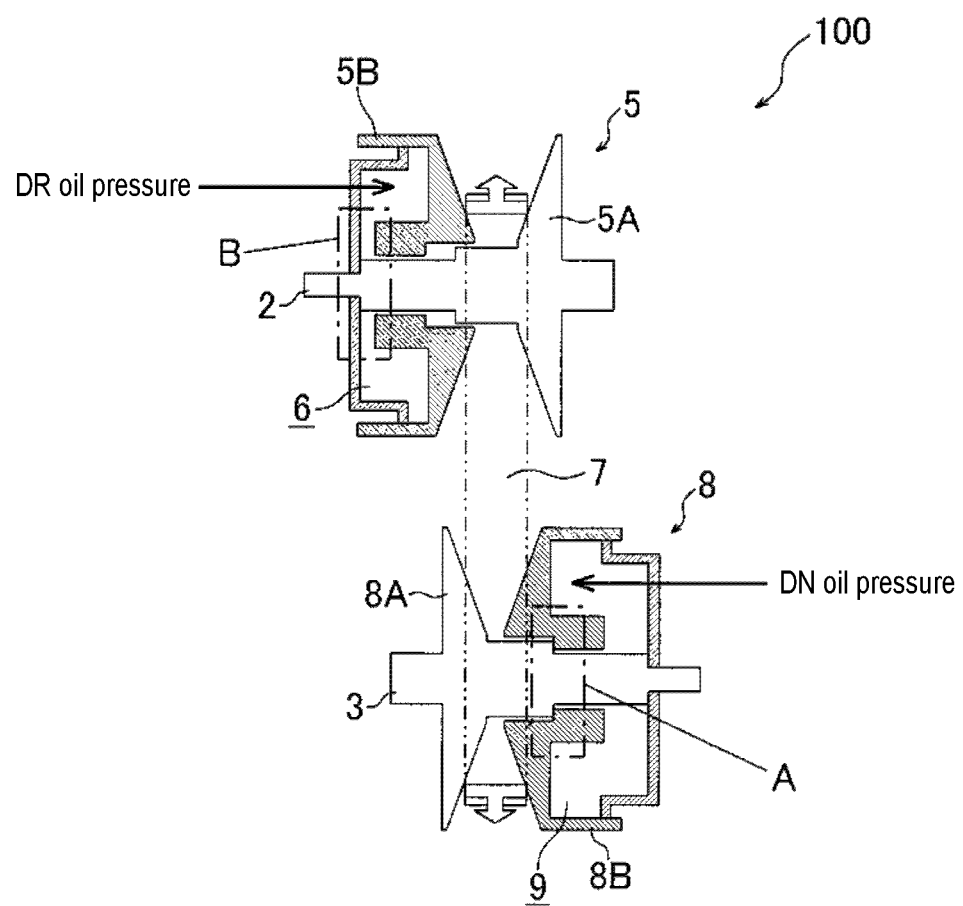
FIG. 3 is a diagram for explaining the structure of the continuously variable transmission of the present embodiment.

FIG. 3 is a diagram for explaining the structure of the continuously variable transmission of the present embodiment. The continuously variable transmission 100 of the present embodiment has a structure that, when shifting to the side where the gear ratio is maximum (the side of low ratio), both the movable side driven pulley half body 8B and the movable side drive pulley half body 5B move to the end on the side where the gear ratio of each of them becomes maximum, but at that time, before the movable side drive pulley half body 5B abuts against its end as shown in the portion B of the figure, the movable side driven pulley half body 8B abuts against its end as shown in the portion A of the figure. "Abutting against the end" as described here means that the moveable side driven pulley half body 8B or the moveable side drive pulley half body 5B abuts against another member at the end of the stroke and stops moving. Therefore, when the gear ratio of the continuously variable transmission 100 is returned to the maximum, the stroke of the movable side driven pulley half body 8B is forcibly stopped at the abutting position. At that time, since the supply (consumption) of oil to the DN cylinder chamber 9 of the driven pulley 8 suddenly stops at the abutment, if the surge pressure occurrence prevention control of the disclosure described later is not performed, there is a risk that surge pressure may occur before the regulator valve 152b that is supplying oil to the driven pulley 8 can open the oil passage for the oil. That is, as the stroke of the movable side driven pulley half body 8B stops at the abutment, the flow rate of oil consumed by the driven pulley 8 suddenly becomes 0, so surge pressure may occur while the dischargeable flow rate of the regulator valve 152b exceeds the flow rate of oil returning from the DN cylinder chamber 9 of the driven pulley 8.

Figure 4:
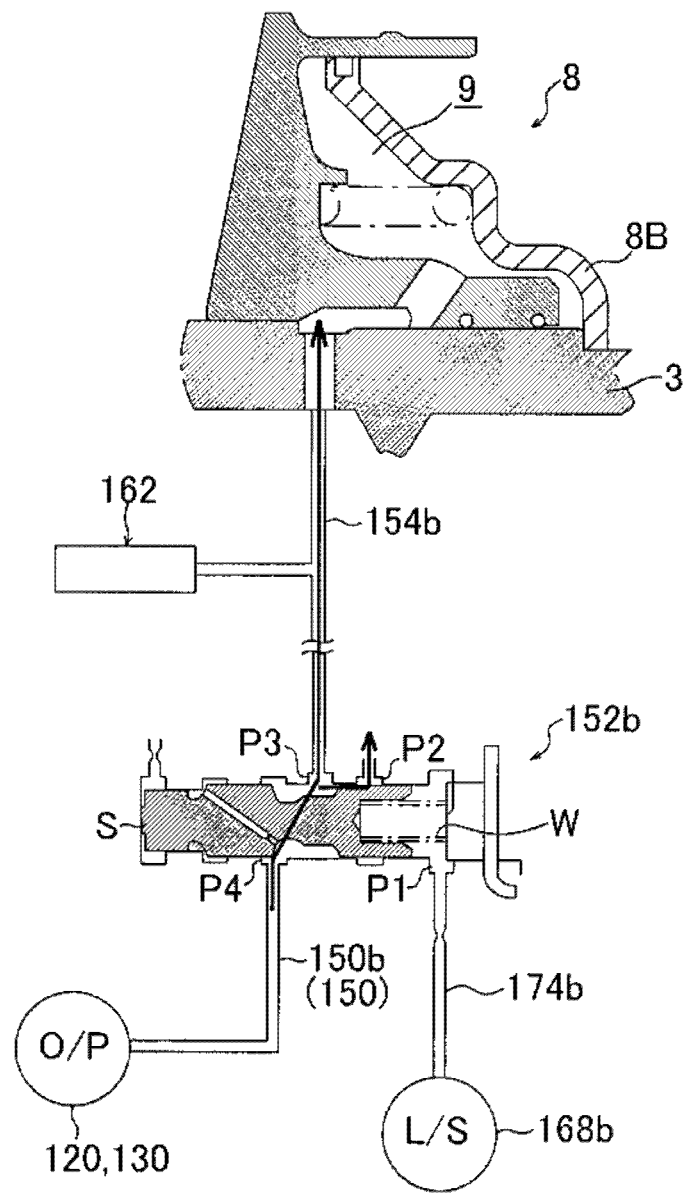
FIG. 4 is a diagram for explaining a phenomenon when surge pressure occurs.

FIG. 4 is a diagram for explaining the phenomenon when the above-described surge pressure occurs, and is a diagram showing the oil pressure circuit from the regulator valve 152b to the DN cylinder chamber 9 of the driven pulley 8. The regulator valve 152b for the driven pulley 8 is a spool valve containing a spool S. The spool S is urged to the left side by an elastic member W arranged on the right side of FIG. 4. Further, the regulator valve 152b has first to fourth ports P1 to P4. The first port P1 is provided at the right end of the regulator valve 152b and communicates with the control valve 168a via the oil passage 174b. In addition, the second port P2 is provided on the left side of the first port P1 and communicates with a discharge oil passage that discharges excess oil. Further, the third port P3 is provided on the left side of the second port P2 and communicates with the DN cylinder chamber 9 of the driven pulley 8 via the oil passage 154b. The fourth port P4 is provided on the left side of the third port P3 and communicates with the first and second pumps 120 and 130 via the oil passage 150b and the oil passage 150.

The oil discharged from one or both of the first pump 120 and the second pump 130 is supplied to the fourth port P4 via the oil passage 150 and the oil passage 150b. Further, oil is supplied from the control valve 168a to the first port P1 via the oil passage 174b. In addition, the oil exiting the third port P3 is supplied to the DN cylinder chamber 9 of the driven pulley 8 via the oil passage 154b.

Then, as shown in the figure, the oil supplied from the first and second pumps 120 and 130 to the regulator valve 152b via the oil passages 150 and 150b is regulated by the regulator valve 152b, and supplied from the port P3 to the DN cylinder chamber 9 of the driven pulley 8 via the oil passage 154b. At this time, if the oil pressure instructed by the control valve 168b to the regulator valve 152b is equal to or smaller than the oil pressure (actual pressure) of the oil supplied from the regulator valve 152b to the driven pulley 8, that is, within the pressure regulating range of the regulator valve 152b, even though there may be oil that returns to the regulator valve 152b due to the increase of the oil pressure of the DN cylinder chamber 9, the oil can be discharged from the discharge oil passage through the second port P2 of the regulator valve 152b. On the other hand, at the timing when the oil pressure instructed by the control valve 168b to the regulator valve 152b becomes larger than the oil pressure (actual pressure) of the oil supplied from the regulator valve 152b to the driven pulley 8, the spool S moves to the left end, and the second port P2 is blocked. In this state, if the oil returns from the DN cylinder chamber 9 when the movable side driven pulley half body 8B abuts, the oil cannot be discharged to the path that communicates with the discharge oil passage (the path for discharging oil) via the second port P2, so the oil that has returned from the DN cylinder chamber 9 causes the oil pressure of the oil passage 154b to rise suddenly, and surge pressure occurs.

FIG. 5 is a table summarizing whether the above-described surge pressure occurs. The table of the figure shows whether surge pressure occurs with respect to the shift speed (large/small), DN instructed pressure (large/small), and oil pump (O/P) discharge amount (large/small) of the continuously variable transmission 100. Here, a state where the instructed pressure of the oil pressure of the oil supplied from the regulator valve 152b to the DN cylinder chamber 9 is larger than the actual pressure (instructed pressure>actual pressure) is defined as DN instructed pressure "large", and a state where the instructed pressure is smaller than the actual pressure (instructed pressure<actual pressure) is defined as DN instructed pressure "small". Further, a state where the discharge amount (discharge flow rate) of the oil pumps 120 and 130 is large is defined as O/P discharge amount "large", and a state where the discharge amount is small is defined as O/P discharge amount "small". This point also applies to FIG. 7 below.

As shown in the table of FIG. 5, surge pressure occurs in the case [1] where the shift speed is high, the DN instructed pressure is large, and the oil pump discharge amount is large, in the case [2] where the shift speed is high, the DN instructed pressure is large, and the oil pump discharge amount is small, and in the case [6] where the shift speed is low, the DN instructed pressure is large, and the oil pump discharge amount is small. Particularly, in the case [2] where the shift speed is high, the DN instructed pressure is large, and the oil pump discharge amount is small, large surge pressure occurs.

FIG. 6A and FIG. 6B are diagrams for explaining the flow of oil in the regulator valve under each condition. In the table of FIG. 5, the reason why surge pressure occurs when the DN instructed pressure is "large" is that, as shown in FIG. 6A, when the DN instructed pressure is "large", the pressure (the instructed oil pressure) of the oil supplied from the control valve 168b to the first port P1, as indicated by the arrow C, in the regulator valve 152b is too large, which causes the spool S to abut against the left end and block the second port P2 communicating with the discharge oil passage, so there is no way for discharging the oil returned from the DN cylinder chamber 9. In addition, the reason why surge pressure occurs when the discharge amount of oil from the first and second pumps 120 and 130 is "small" is that, as shown in FIG. 6B, when the discharge pressure of the oil pumps 120 and 130 is "small", the force that pushes the spool S of the regulator valve 152b to the right side is insufficient (the pressure of the oil of the arrow D is small), which causes the second port P2 communicating with the discharge oil passage to be blocked even in this case, so there is no way for discharging the oil returned from the DN cylinder chamber 9.

Furthermore, when the shift speed of the continuously variable transmission 100 is high, the consumption flow rate of oil in the continuously variable transmission 100 is large as compared with the case where the shift speed is low, so surge pressure may also occur in this case, and the surge pressure generated tends to be larger. The shift speed described here refers to the change amount per unit time of the gear ratio (ratio) of the continuously variable transmission 100.

Therefore, in the control device of the present embodiment, if there is a risk that the above-described surge pressure may occur, control (hereinafter, this is referred to as "surge pressure occurrence prevention control") is performed for the control valve 168b to lower the instructed pressure for the regulator valve 152b when predetermined conditions are satisfied, as a control for preventing the occurrence of surge pressure. Hereinafter, the surge pressure occurrence prevention control will be described.

FIG. 7 is a diagram for explaining the conditions for performing the surge pressure occurrence prevention control, and is a list of cases where surge pressure occurs. The surge pressure occurrence prevention control is performed when the first condition, the second condition, and the third condition shown in FIG. 7 and the following are satisfied.

First condition: when the instructed oil pressure (DN instructed pressure) of the control valve 168b for the regulator valve 152b is larger than the actual pressure (DN actual pressure) of the oil supplied from the regulator valve 152b to the driven pulley (DN instructed pressure "large")

Second condition: when the discharge amount of oil from the oil pumps 120 and 130 is smaller than the predetermined amount (O/P discharge amount "small")

Third condition: when the shift speed of the continuously variable transmission 100 is higher than the predetermined speed (shift speed "high")

Figure 8:
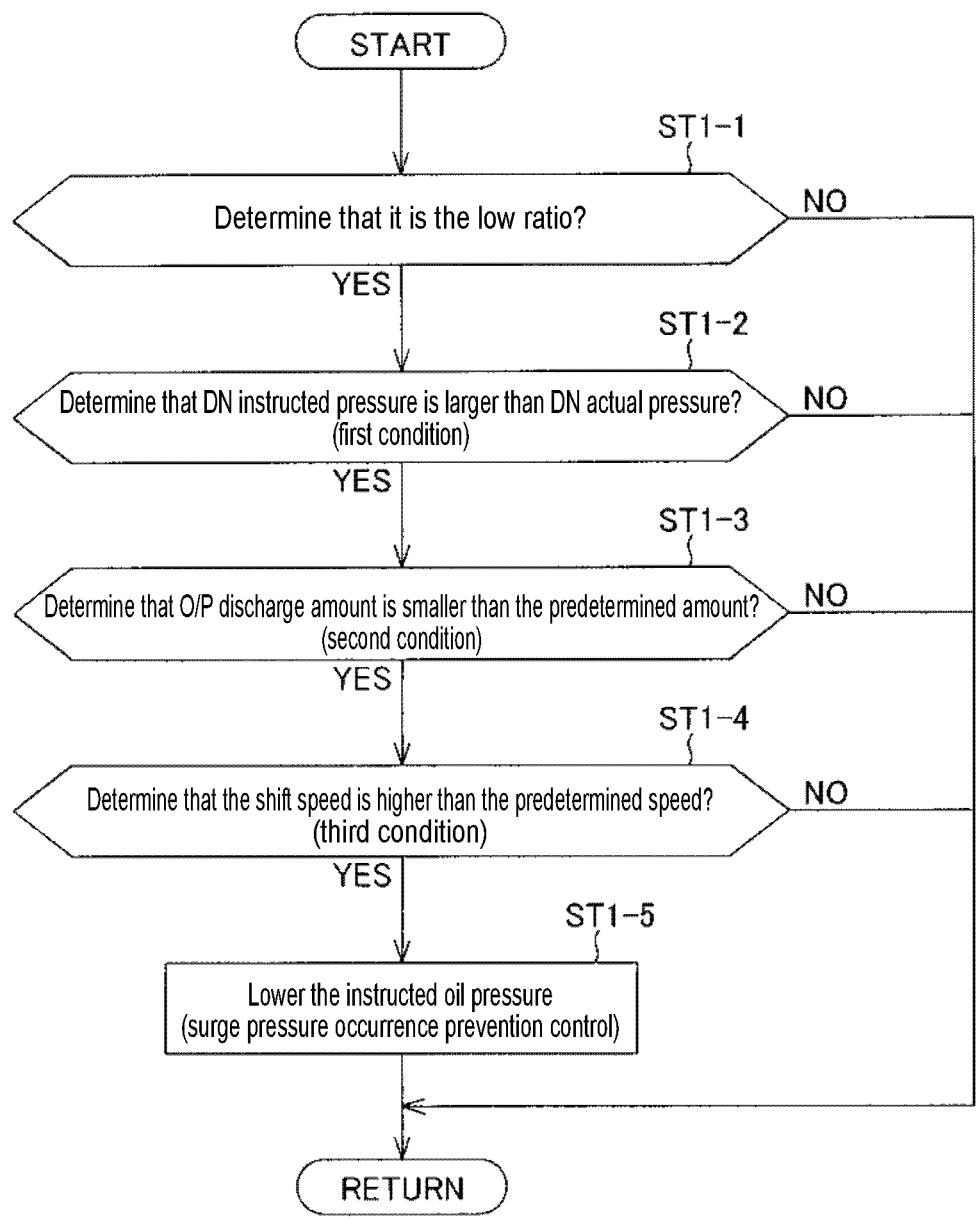
FIG. 8 is a flowchart showing a flow of determination when performing surge pressure occurrence prevention control.

FIG. 8 is a flowchart showing a flow of determination when performing the surge pressure occurrence prevention control. As shown in the flowchart of the figure, first, it is determined whether the gear ratio of the continuously variable transmission 100 is maximum (the ratio becomes the low ratio) (step ST1-1). The determination that the gear ratio is maximum here can be made, for example, when the vehicle suddenly decelerates due to a brake operation performed by the driver of the vehicle, or when a sudden downshift is instructed by a shift operation performed by the driver. Moreover, in addition to determining that the gear ratio is maximum when the gear ratio of the continuously variable transmission 100 reaches the substantially maximum value, the gear ratio of the continuously variable transmission 100 may be determined as maximum when it is determined that the gear ratio reaches a value that can be regarded as the maximum value. As a result, if it is determined that the gear ratio of the continuously variable transmission 100 is not maximum (NO), the processing returns to the start without performing the subsequent processes. On the other hand, if it is determined that the gear ratio of the continuously variable transmission 100 is maximum (YES), then, as the first condition, it is determined whether the instructed oil pressure (DN instructed pressure) of the control valve 168b for the regulator valve 152b is larger than the actual pressure (DN actual pressure) of the oil supplied from the regulator valve 152b to the driven pulley 8 (step ST1-2). As a result, if it is determined that the DN instructed pressure is not larger than the DN actual pressure (NO), the processing returns to the start without performing the subsequent processes. On the other hand, if it is determined that the DN instructed pressure is larger than the DN actual pressure (YES), subsequently, as the second condition, it is determined whether the discharge amount of the oil pumps 120 and 130 is smaller than the predetermined amount (step ST1-3). As a result, if the discharge amount of the oil pumps 120 and 130 is larger than the predetermined amount (O/P discharge amount "large") (NO), the processing returns to the start without performing the subsequent processes. On the other hand, if the discharge amount of the oil pumps 120 and 130 is smaller than the predetermined amount (O/P discharge amount "small") (YES), subsequently, as the third condition, it is determined whether the shift speed of the continuously variable transmission 100 is higher than the predetermined speed (step ST1-4). As a result, if the shift speed of the continuously variable transmission 100 is lower than the predetermined speed (NO), the processing returns to the start without performing the subsequent processes. On the other hand, if the shift speed of the continuously variable transmission 100 is higher than the predetermined speed (YES), control (surge pressure occurrence prevention control) is executed to lower the instructed oil pressure of the control valve 168*b* for the regulator valve 152*b* (step ST1-5).

Figure 9:
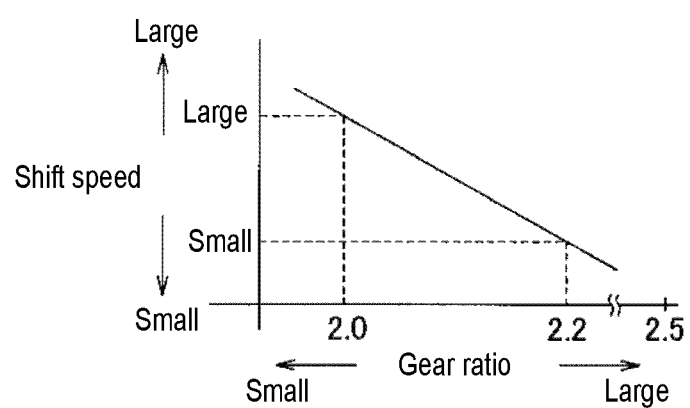
FIG. 9 is a diagram showing an example of a map for deciding a timing of lowering an instructed pressure in surge pressure occurrence prevention control.

FIG. 9 is a diagram showing an example of a map for deciding the timing of lowering the instructed pressure in the surge pressure occurrence prevention control. In the surge pressure occurrence prevention control, the instructed pressure is lowered when the gear ratio is determined from the relationship between the gear ratio and the shift speed of the continuously variable transmission 100. In this case, as shown in the map of the figure, the gear ratio for starting the surge pressure occurrence prevention control is changed according to the shift speed. As an example, when the maximum value of the gear ratio (ratio of the end on the low ratio side) of the continuously variable transmission 100 is 2.5, if the shift speed is "large", the surge pressure occurrence prevention control is started when the gear ratio is 2.0. In addition, if the shift speed is "small", the surge pressure occurrence prevention control is started when the gear ratio is 2.2. Here, as the shift speed and the gear ratio are inversely proportional to each other, when the shift speed of the continuously variable transmission 100 is large (fast), the gear ratio for starting the control for lowering the instructed oil pressure is set to a smaller value (ratio on the high ratio side) as compared with the case where the shift speed is small (slow).

Furthermore, when the above-described surge pressure occurrence prevention control is performed, the gear ratio of the continuously variable transmission 100 does not reach the maximum value (complete low ratio), but becomes a value slightly smaller than the maximum value (ratio on the high ratio side slightly higher than the low ratio). Therefore, if the vehicle stops once and then restarts in this state, sufficient starting performance may not be ensured. Therefore, if the vehicle stops after the above-described surge pressure occurrence prevention control is performed, it is preferable to return the instructed oil pressure of the control valve 168*b* for the regulator valve 152*b* from the lowered state to the original instructed oil pressure so as to set the gear ratio of the continuously variable transmission 100 to the maximum value. Thereby, it is possible to secure sufficient starting performance when the vehicle restarts after stop.

As described above, according to the control device for the continuously variable transmission of the present embodiment, if it is determined that the gear ratio of the continuously variable transmission 100 is maximum, as the first condition, when the instructed oil pressure of the control valve 168*b* for the regulator valve 152*b* is larger than the actual pressure of the oil supplied from the regulator valve 152*b* to the driven pulley, the control for lowering the instructed oil pressure is performed.

If the instructed oil pressure of the control valve 168*b* for the regulator valve 152*b* is larger than the actual pressure of the oil supplied from the regulator valve 152*b* to the driven pulley, in the regulator valve 152*b*, the second port P2 communicating with the discharge oil passage is blocked, so there is no way for discharging the oil returned from the driven pulley 8, and surge pressure may occur. Therefore, here, as the first condition, when the instructed oil pressure of the oil supplied from the regulator valve 152*b* to the driven pulley 8 is larger than the actual oil pressure, the surge pressure occurrence prevention control that lowers the instructed oil pressure of the oil supplied to the driven pulley 8 is performed, making it possible to effectively prevent the occurrence of surge pressure.

Further, in addition to the first condition, as the second condition, when the discharge amount of oil from the first and second pumps 120 and 130 is smaller than the predetermined amount, the surge pressure occurrence prevention control that lowers the instructed oil pressure is performed.

If the discharge amount of oil from the first and second pumps 120 and 130 is small (the discharge pressure is small), the flow rate of the oil supplied to the regulator valve 152*b* becomes small (the oil pressure of the oil becomes small). Therefore, in this case, the second port P2 communicating with the discharge oil passage in the regulator valve 152*b* is also blocked, so there is no way for discharging the oil returned from the driven pulley 8, and surge pressure may occur. Therefore, here, as the second condition, when the discharge amount of oil from the first and second pumps 120 and 130 is smaller than the predetermined amount, the surge pressure occurrence prevention control that lowers the instructed oil pressure is performed, making it possible to effectively prevent the occurrence of surge pressure.

Further, in addition to the first and second conditions, as the third condition, when the shift speed of the continuously variable transmission 100 is higher than the predetermined speed, the control that lowers the instructed oil pressure is performed.

When the shift speed of the continuously variable transmission 100 is higher than the predetermined speed, the momentum of the moveable side driven pulley half body 8B abutting against the end becomes stronger as compared with the case where the shift speed is low. In addition, the change amount of the flow rate of the oil supplied to the continuously variable transmission 100 also becomes large. Therefore, there is a concern that the surge pressure generated may become large. Therefore, here, as the third condition, when the shift speed of the continuously variable transmission 100 is higher than the predetermined speed, the surge pressure occurrence prevention control that lowers the instructed oil pressure is performed, making it possible to effectively prevent the occurrence of large surge pressure.

In addition, the surge pressure occurrence prevention control that lowers the instructed oil pressure is started when the gear ratio of the continuously variable transmission 100 reaches a predetermined value, and the predetermined value of the gear ratio is obtained from the relationship between the shift speed and the gear ratio of the continuously variable transmission 100 determined in advance according to the shift speed of the continuously variable transmission 100.

Accordingly, the surge pressure occurrence prevention control that lowers the instructed oil pressure can be started at an appropriate timing according to the shift speed of the continuously variable transmission 100. Therefore, it is possible to more effectively prevent the occurrence of surge pressure.

Further, the regulator valve 152b of the present embodiment is in a state where the second port P2 is blocked when the oil pressure (instructed oil pressure) of the oil supplied from the control valve 168b to the regulator valve 152b is larger than the oil pressure (actual oil pressure) of the oil supplied from the regulator valve 152b to the driven pulley 8.

According to this configuration, when the instructed oil pressure of the control valve 168b for the regulator valve 152b is larger than the oil pressure of the oil supplied from the regulator valve 152b to the driven pulley 8, the second port P2 is blocked, so there is a risk that surge pressure may occur. In the disclosure, the surge pressure occurrence prevention control that lowers the instructed oil pressure of the control valve 168b for the regulator valve 152b is performed, making it possible to effectively prevent the occurrence of surge pressure due to the second port P2 being blocked.

Although the embodiments of the disclosure have been described above, the disclosure is not limited to the above embodiments, and various modifications can be made within the scope of the claims and the scope of the technical ideas of the specification and drawings.

For example, the above embodiment illustrates a case where the surge pressure occurrence prevention control is executed when all of the above first condition, second condition, and third condition are satisfied. In addition thereto, the surge pressure occurrence prevention control may be executed when only the first condition is satisfied, or the surge pressure occurrence prevention control may be executed when only the first condition and the second condition are satisfied.

What is claimed is:

1. An oil pressure control device for a continuously variable transmission, comprising:
    a belt-type continuously variable transmission comprising movable drive pulley and driven pulley mounted on a vehicle, and an endless belt wound around the two pulleys; and
    an oil pressure control device controlling the continuously variable transmission,
    wherein the oil pressure control device comprises:
    a pressure regulating valve that regulates an oil pressure of oil supplied from an oil supply source to a cylinder chamber of the driven pulley;
    a control valve that controls the pressure regulating valve;
    a control part that controls the control valve; and
    an oil pressure detection part that detects an oil pressure of oil supplied from the pressure regulating valve to the cylinder chamber,
    wherein if the control part determines that a gear ratio of the continuously variable transmission is maximum, as a first condition, when an instructed oil pressure of the control valve for the pressure regulating valve is larger than the oil pressure of oil supplied from the pressure regulating valve to the driven pulley, a control for lowering the instructed oil pressure is performed.

2. The oil pressure control device for the continuously variable transmission according to claim 1, wherein in addition to the first condition, as a second condition, when a discharge amount of oil discharged from the oil supply source is smaller than a predetermined amount, the control for lowering the instructed oil pressure is performed.

3. The oil pressure control device for the continuously variable transmission according to claim 2, wherein in addition to the first condition and the second condition, as a third condition, when a shift speed of the continuously variable transmission is higher than a predetermined speed, the control for lowering the instructed oil pressure is performed.

4. The oil pressure control device for the continuously variable transmission according to claim 3, wherein the control for lowering the instructed oil pressure is started when the gear ratio of the continuously variable transmission reaches a predetermined value, and
    the predetermined value of the gear ratio is a gear ratio obtained from a relationship between the shift speed and the gear ratio of the continuously variable transmission determined in advance according to the shift speed of the continuously variable transmission.

5. The oil pressure control device for the continuously variable transmission according to claim 3, wherein if the vehicle stops after the control for lowering the instructed oil pressure is performed, a control for returning the lowered instructed oil pressure to an original instructed oil pressure is performed.

6. The oil pressure control device for the continuously variable transmission according to claim 2, wherein the control for lowering the instructed oil pressure is started when the gear ratio of the continuously variable transmission reaches a predetermined value, and
    the predetermined value of the gear ratio is a gear ratio obtained from a relationship between a shift speed and the gear ratio of the continuously variable transmission determined in advance according to the shift speed of the continuously variable transmission.

7. The oil pressure control device for the continuously variable transmission according to claim 2, wherein if the vehicle stops after the control for lowering the instructed oil pressure is performed, a control for returning the lowered instructed oil pressure to an original instructed oil pressure is performed.

8. The oil pressure control device for the continuously variable transmission according to claim 1, wherein the control for lowering the instructed oil pressure is started when the gear ratio of the continuously variable transmission reaches a predetermined value, and
    the predetermined value of the gear ratio is a gear ratio obtained from a relationship between a shift speed and the gear ratio of the continuously variable transmission determined in advance according to the shift speed of the continuously variable transmission.

9. The oil pressure control device for the continuously variable transmission according to claim 8, wherein a gear ratio for starting the control for lowering the instructed oil pressure when the shift speed of the continuously variable transmission is high is smaller than a gear ratio when the shift speed is low.

10. The oil pressure control device for the continuously variable transmission according to claim 9, wherein if the vehicle stops after the control for lowering the instructed oil pressure is performed, a control for returning the lowered instructed oil pressure to an original instructed oil pressure is performed.

11. The oil pressure control device for the continuously variable transmission according to claim 8, wherein if the vehicle stops after the control for lowering the instructed oil pressure is performed, a control for returning the lowered instructed oil pressure to an original instructed oil pressure is performed.

12. The oil pressure control device for the continuously variable transmission according to claim 1, wherein the pressure regulating valve comprises a first port to which oil from the control valve that controls the pressure regulating valve is supplied, a second port which communicates with a discharge oil passage that discharges oil, a third port which supplies oil to the driven pulley, and a fourth port which supplies oil from the oil supply source, and when the instructed oil pressure of the control valve for the pressure regulating valve is larger than the oil pressure of oil supplied from the pressure regulating valve to the driven pulley, the second port is blocked.

13. The oil pressure control device for the continuously variable transmission according to claim 12, wherein if the vehicle stops after the control for lowering the instructed oil pressure is performed, a control for returning the lowered instructed oil pressure to an original instructed oil pressure is performed.

14. The oil pressure control device for the continuously variable transmission according to claim 1, wherein if the vehicle stops after the control for lowering the instructed oil pressure is performed, a control for returning the lowered instructed oil pressure to an original instructed oil pressure is performed.

* * * * *